(12) United States Patent
Chan et al.

(10) Patent No.: US 8,184,651 B2
(45) Date of Patent: May 22, 2012

(54) PLD ARCHITECTURE OPTIMIZED FOR 10G ETHERNET PHYSICAL LAYER SOLUTION

(75) Inventors: Allen Chan, San Jose, CA (US); Sergey Shumarayev, Los Altos Hills, CA (US); Wilson Wong, San Francisco, CA (US); Weiqi Ding, Fremont, CA (US)

(73) Assignee: Altera Corporation, San Jose, CA (US)

( * ) Notice: Subject to any disclaimer, the term of this patent is extended or adjusted under 35 U.S.C. 154(b) by 255 days.

(21) Appl. No.: 12/100,360

(22) Filed: Apr. 9, 2008

(65) Prior Publication Data
US 2009/0257445 A1 Oct. 15, 2009

(51) Int. Cl.
*H04L 12/56* (2006.01)
(52) U.S. Cl. ...................................................... 370/419
(58) Field of Classification Search .................. None
See application file for complete search history.

(56) References Cited

U.S. PATENT DOCUMENTS

| | | | |
|---|---|---|---|
| 3,789,354 A * | 1/1974 | Sternberg et al. | 367/8 |
| 6,650,194 B1 * | 11/2003 | Kertis et al. | 331/117 R |
| 7,131,024 B1 * | 10/2006 | Venkata et al. | 713/500 |
| 2004/0028158 A1 | 2/2004 | Fujimori et al. | |
| 2004/0030805 A1 | 2/2004 | Fujimori et al. | |
| 2004/0109465 A1 * | 6/2004 | Kim et al. | 370/419 |
| 2004/0257856 A1 * | 12/2004 | Liu | 365/154 |
| 2005/0212556 A1 * | 9/2005 | Lee et al. | 326/38 |
| 2006/0083185 A1 * | 4/2006 | Wang et al. | 370/299 |

FOREIGN PATENT DOCUMENTS
EP 1744458 1/2007

OTHER PUBLICATIONS

"The IEEE 802.3 Standard," Institute of Electrical and Electronics Engineers, Inc., Dec. 2005.
"Virtex-4 Rocket10 Multi-Gigabit Transceiver User Guide," UG076 (v4.0), Xilinx, pp. 1-339, Aug. 17, 2007 (see especially Figures 2-4, 2-5, 2-7, and 2-8).
Takeshi Yoshino et al., "Analysis of 10 Gigabit Ethernet using Hardware Engine for Performance Tuning on Long Fat-pipe Network", University of Tokyo, 2007 pp. 43-48.

* cited by examiner

*Primary Examiner* — Yong Zhou
(74) *Attorney, Agent, or Firm* — Ropes & Gray LLP

(57) ABSTRACT

An integrated circuit (e.g., a programmable integrated circuit such as a programmable microcontroller, a programmable logic device, etc.) includes programmable circuitry and 10 Gigabit Ethernet (10 GbE) transceiver circuitry. The programmable circuitry and the transceiver circuitry may be configured to implement the physical (PHY) layer of the 10 GbE networking specification. This integrated circuit may then be coupled to an optical transceiver module in order to transmit and receive 10 GbE optical signals. The transceiver circuitry and interface circuitry that connects the transceiver circuitry with the programmable circuitry may be hard-wired or partially hard-wired.

26 Claims, 4 Drawing Sheets

PLD ARCHITECTURE OPTIMIZED FOR 10G ETHERNET PHYSICAL LAYER SOLUTION

BACKGROUND OF THE INVENTION

This invention relates to integrated circuit devices, and more particularly to 10 Gigabit Ethernet (10 GbE) physical (PHY) layer circuitry for use in programmable integrated circuit devices.

As the demand for network bandwidth increases, the adoption of 10 GbE is gaining a great deal of momentum for use in local area networks (LANs), wide area networks (WANs), and metropolitan area networks (MANs). 10 GbE is a version of Ethernet with a nominal data rate of 10 Gigabits per second and is specified by the IEEE 802.3ae standard. The IEEE 802.3ae standard is incorporated by reference herein in its entirety. Due to the high speed and demanding specifications of the 10 GbE standard, especially at the PHY layer, performance is a key differentiating factor between network equipment providers.

The PHY layer of 10 GbE can be implemented by integrating a number of available components that communicate via standard interfaces. For example, a typical 10 GbE PHY layer may be implemented by connecting a network processor to a 10 GbE Media Access Control (MAC) device via a 16-bit double data rate (DDR) System Physical Interface Level 4 (SPI-4) interface standard. The network processor and MAC devices are technically not part of the PHY layer, but are included in the description of the PHY layer to give context to the manner in which the PHY layer connects to higher network layers. The MAC device may be connected to a Physical Coding Sublayer (PCS) device via 64-bit 10 Gigabit Media Independent Interface (XGMII). XGMII is a standard for connecting full duplex 10 GbE ports to each other and to other electronic devices on a printed circuit board. The PCS device is connected to a 10 GbE optical transceiver via 10 Gigabit Ethernet 16-bit Interface (XSBI). Finally, the optical transceiver transmits and receives a 10 GbE optical signal. Even though this 10 GbE PHY layer implementation can be designed using available components, integrating such a PHY layer design within a system requires many components, uses a large amount of circuit board area, and creates potentially complex layout and interoperability issues.

It is therefore desirable to give integrated circuit devices and especially programmable integrated circuit devices such as programmable microcontrollers, programmable logic devices ("PLDs"), etc., the ability implement 10 GbE solutions in a less complex and more efficient manner. The integration of PLDs with 10 GbE implementations generally involves generating higher level network devices (e.g., network controllers and MAC devices) within the PLD and connecting the PLD outputs to specially designed optical modules that implement the specialized 10 GbE PHY layer circuitry. However, these implementations do little to reduce the complexity of the 10 GbE implementations. The large bus protocols that are needed to connect the optical modules to the PLDs are complex and lead to reduced performance. Typically implementing these protocols within a PLD requires additional buffers, clock dividers, and reference clock signals which adds latency, timing constraints, and power consumption to the system. Further, compared to ordinary optical transceivers, the optical modules that must be used in this implementation are expensive and have high power and space requirements. Therefore it would be desirable to provide programmable integrated circuit devices that can implement the physical layer of 10 GbE circuitry.

SUMMARY OF THE INVENTION

In accordance with certain possible aspects of the invention, an integrated circuit may include programmable circuitry and 10 Gigabit Ethernet (10 GbE) physical (PHY) layer circuitry. This 10 GbE PHY layer circuitry includes a 10 GbE transceiver circuit that can be serially coupled to a 10 GbE optical transceiver module. The 10 GbE transceiver circuit implemented within the integrated circuit can serialize parallel data received from the programmable circuitry for transmission to the optical transceiver module and can deserialize serial data received from the optical transceiver module and provide this data in parallel to the programmable circuitry. Having this 10 GbE transceiver circuit implemented within the integrated circuit allows portions of the programmable circuitry to be programmed to implement 10 GbE PHY layer circuitry.

Further features of the invention, its nature and various advantages, will be more apparent from the accompanying drawings and the following detailed description.

DETAILED DESCRIPTION

Although the invention is equally applicable to other types of integrated circuits (e.g., various kinds of programmable integrated circuits such as programmable microcontrollers, etc.), the invention will be fully understood from the following illustrative discussion of its application to the type of integrated circuits known as programmable logic devices (PLDs).

Figure 1:
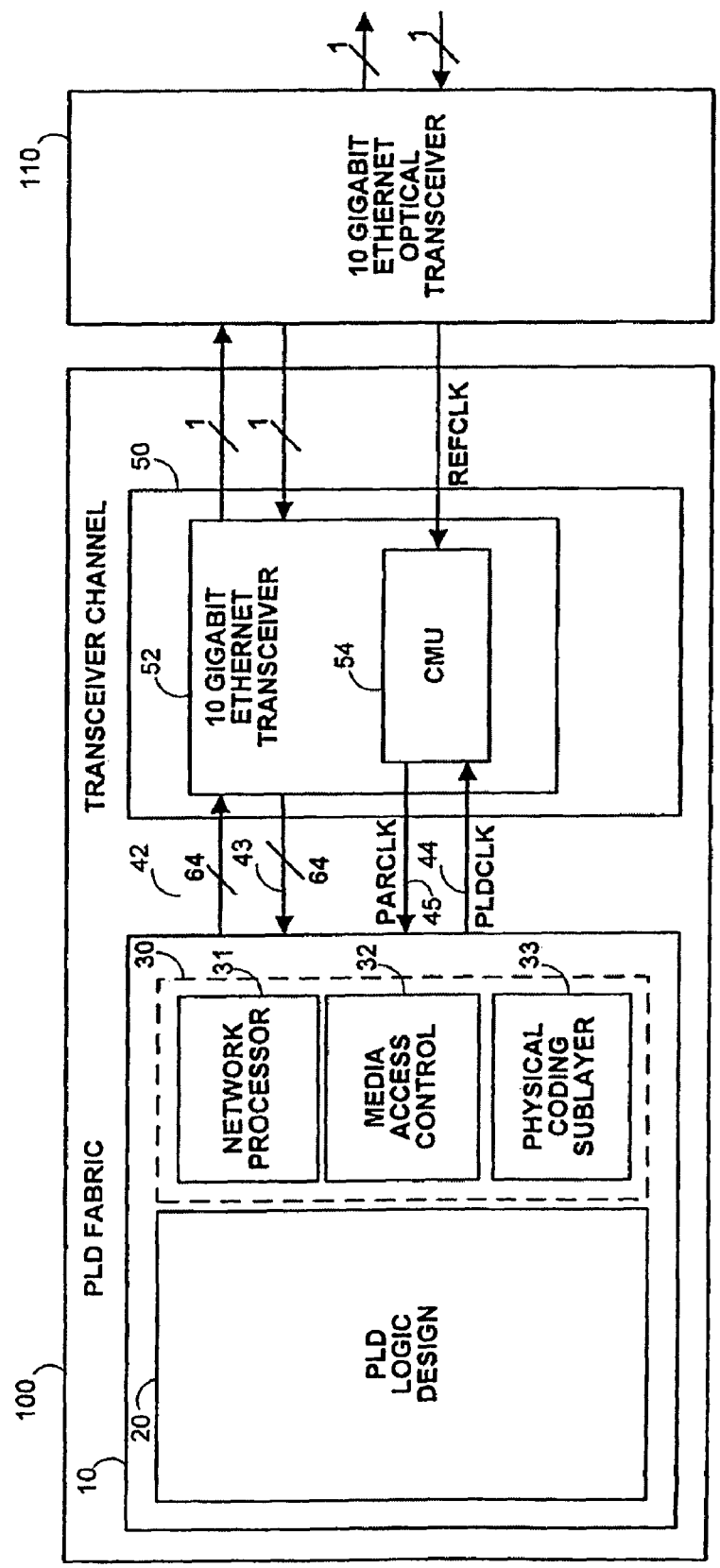
FIG. 1 is a simplified schematic block diagram of an illustrative programmable logic device that includes 10 Gigabit Ethernet physical layer circuitry in accordance with one embodiment of the invention.

An illustrative embodiment of a 10 Gigabit Ethernet (10 GbE) physical (PHY) layer implemented within a PLD in accordance with the invention is shown in FIG. 1. As shown in FIG. 1, PLD 100 includes primarily general-purpose-programmable logic fabric 10 and transceiver channel 50. PLD 100 is connected to 10 GbE optical transceiver module 110 that coverts electrical 10 GbE signals into optical 10 GbE signals and vise versa. Thus, other than the optical-electrical conversion provided by 10 GbE optical transceiver module 110, all of the functions of the 10 GbE PHY layer may be implemented within PLD 100.

PLD fabric 20 typically includes an array of blocks of programmable logic. It may also include blocks of other kinds such as memory blocks, microprocessor blocks, digital signal processing ("DSP") blocks, etc. PLD fabric 10 also typically includes a network of programmable interconnection resources, which can be used to make connections to, from, and/or between the logic and other blocks in any of many different ways. PLD fabric 10 still further typically has various types of clock circuitry, which may include programmable networks for distributing various clock signals throughout the device, phase-locked loop ("PLL") circuitry, etc.

FIG. 1 shows PLD fabric 10 partitioned into a PLD logic design portion 20 and a 10 GbE portion 30. This is somewhat artificial and is done primarily for purposes of discussion herein, because the elements of 10 GbE portion 30 may in fact be no different or not greatly different than other portions of PLD fabric 10. Thus, 10 GbE portion 30 may be implemented by appropriately programming some of the general-purpose logic and general-purpose interconnect, etc., of PLD fabric 20 (just as PLD logic design 20 is implemented by appropriately programming other general-purpose logic and interconnect, etc., of the PLD fabric).

10 GbE portion 30 includes Network. Processor 31, 10 GbE Media Access Control (MAC) 32, and 10 GbE physical coding sublayer (PCS) 33. Like their standalone counterparts described above, these elements of 10 GbE portion 30 can be interconnected together to implement the respective portions of a 10 GbE system including the PHY layer. However, because Network Processor 31, MAC 32, and PCS 33 are implemented within PLD fabric 10, the interface standards between these individual elements may be relaxed or even ignored. Signals may be routed between these elements of 10 GbE portion 30 in any suitable matter as long as the ultimate outputs of PLD 100 conform to the appropriate interface standards. For the same reason, even though the elements of 10 GbE portion 30 are shown partitioned into discrete elements, the functionality of 10 GbE portion 30 may be achieved using any number of different elements that may or may not individually correspond to standardized 10 GbE components. Thus, implementing 10 GbE portion 30 within PLD fabric may permit increased flexibility. Moreover, 10 GbE portion 30 can also be customized for specific implementations, may be upgraded or modified as requirements or as standards evolve, and may be configured using industry tested designs.

Transceiver channel 50 is shown as including 10 GbE Transceiver 52 which includes clock management (or multiplier) unit ("CMU") circuitry 54. CMU receives one or more reference clock signal (e.g., from PLD fabric 10 (PLD-CLOCK), from optical transceiver 110 (REFCLK), or from a source external to PLD 100 (not shown)) and produces clock signals that may be used for such purposes as clocking serializer and deserializer circuitry within transceiver 52 and providing a reference clock signal (PARCLK) to PLD fabric 10. The operation of CMU 54 will be described in greater detail below with reference to FIG. 2.

It should be noted that whereas PLD fabric 10 is for the most part general-purpose circuitry that can be used to perform any of a vast array of different functions (including the functions of 10 GbE portion 30), the components of transceiver channel 50 and interface 60 tend to be hard-wired or at least partly hard-wired to perform the particular functions of the 10 GbE transceiver. Some of the parameters of the functions that these dedicated-components perform may be selectable and therefore variable (e.g., programmably selectable). But in each case such a hard-wired component is dedicated to performing a particular function or type of function. An example of such a dedicated component in 10 GbE transceiver 52 would be CMU 54. Other dedicated components of 10 GbE transceiver 52 that may include a transmitter, a receiver, a serializer, a deserializer, clock data recovery (CDR) circuitry etc. These dedicated components may provide increased performance over similar components than equivalent components implements in PLD fabric 10.

Interface 60 between PLD fabric 10 and transceiver channel 50 includes 6.4-bit parallel data buses 42 and 43 between PLD fabric 10 and transceiver 52 and clock signals 44 and 45 between PLD fabric 10 and CMU 54. A 64-bit wide bus may be used in order to simplify the data channel between transceiver 52 and typical PCS designs implemented within PLD fabric 10. Further, for the same reasons, this 64-bit data interface may be designed to meet the electrical specifications of the 10 GbE standards. However, it should be noted that this bus is not required to use a 64-bit wide bus or conform to 10 GbE standards because this interface is internal to PLD 100.

Figure 2:
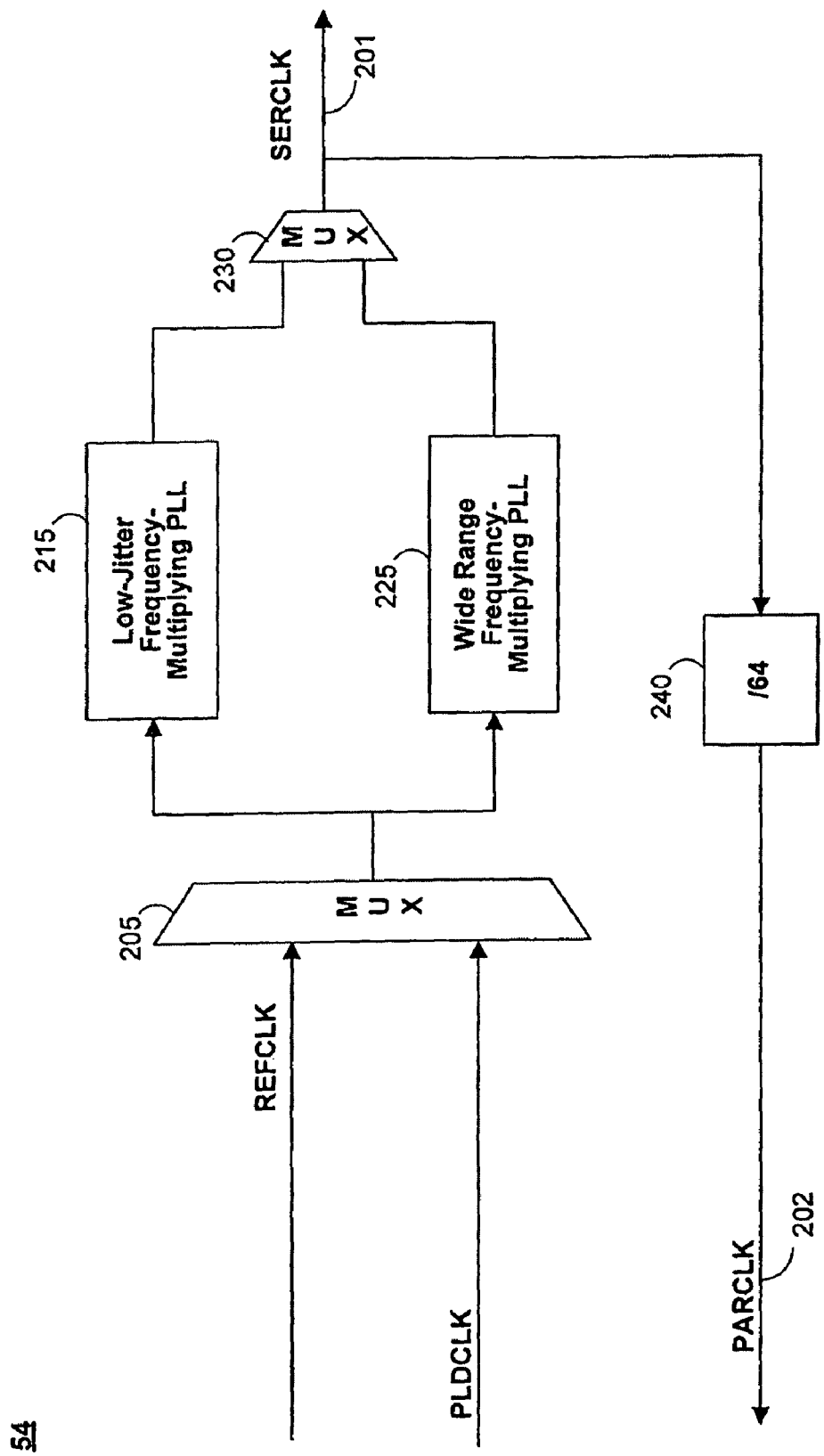
FIG. 2 is a simplified schematic block diagram of a clock management unit from the programmable logic device of FIG. 1 in accordance with the invention.

FIG. 2 shows a schematic block diagram of an exemplary CMU 54 that may be implemented within transceiver channel 50. In addition to other clock signals that CMU 54 may produce based on its input clock signals REFCLK and PLD-CLK, CMU 54 also produces (based on the input clock signals) at least (1) a SERCLK signal on lead 201 for clocking the 10 GbE serial data transmitted from transceiver channel 50, and (2) a PARCLK signal on lead 202 for clocking the parallel data from received from PLD fabric 10 via the 64-bit interface which has a frequency that is 1/64 the serial data signal clock frequency. It should be understood that these clock signals or other suitable clock signals receive or generated by transceiver channel 50 may be used to clock the serial data received by transceiver channel 50 and send this data in parallel to PLD Fabric 10 via the 64-bit interface.

As shown in FIG. 2 CMU 54 receives two input clock signals, PLDCLK and REFCLK. PLDCLK is received from PLD fabric 10 while REFCLK is received from external source. REFCLK may be received from 10 GbE optical Transceiver module 110 as shown in FIG. 1 or may be received from a different source (e.g., a reference clock generation circuit). One of the clock signals is selected using multiplexer 205 and is provided to frequency-multiplying phase-locked loops (PLLs) 215 and 225. In some other embodiment only a single input clock signals is received and multiplexer 205 may not be required.

Frequency-multiplying PLLs 215 and 225 can generate one or more clock signals having clock rates that are multiples of and that are synchronized to the input reference clock signal. PLLs 215 and 225 may have programmably selectable multiplication factor M in order to produce a clock signal having an appropriate serial clock rate for 10 GbE transceiver 52. For example, given a reference clock having a frequency of 161.13 MHz and a multiplication factor of 32 would generate a clock signal having a frequency of 5156.16 MHz. Similarly, given a reference clock having a frequency of 644.53 MHz and a multiplication factor of 8 would generate a clock signal having a frequency of 5156.24 MHz.

Typically, when selecting a PLL design there may be a certain amount of tradeoff between PLL frequency range and PLL frequency accuracy. Designs for both analog and digital PLLs of both types are well known. For example, low-jitter PLL 215 may be designed using an inductive (LC) voltage controlled oscillator while wide-range PLL 225 may be designed using a ring voltage-controlled oscillator. In some embodiments, one or both of the PLLs may be replaced by delay-locked loops (DLLs). Furthermore, in some embodiments, the PLLs may output more than one clock signal. These multiple clock signals may be phase-shifted versions of the same generated clock signal. The clock signal having a phase closest to the desired phase may be selected from the multiple clock signals. Alternatively two clock signals having different phases may be phase-mixed to produce a clock signal having a phase that falls between the two clock signals.

In order to provide increased flexibility, CMU 54 is illustrated as having one of each PLL type and may select the clock signal output from either of the two PLLs using multiplexer 230. The selection may be based on the frequency of the input clock and the multiplication factor, comparison of the PLL output signals, or any other suitable factor. The output of multiplexer 230 is SERCLK, the clock signal used to clock the 10 GbE serial data signal. CMU 54 also generates a parallel clock PARCLK used to interface 10 GbE transceiver 52 with PLD fabric 10. PARCLK may be generated by providing SERCLK to frequency dividing circuitry 240.

Figure 3:
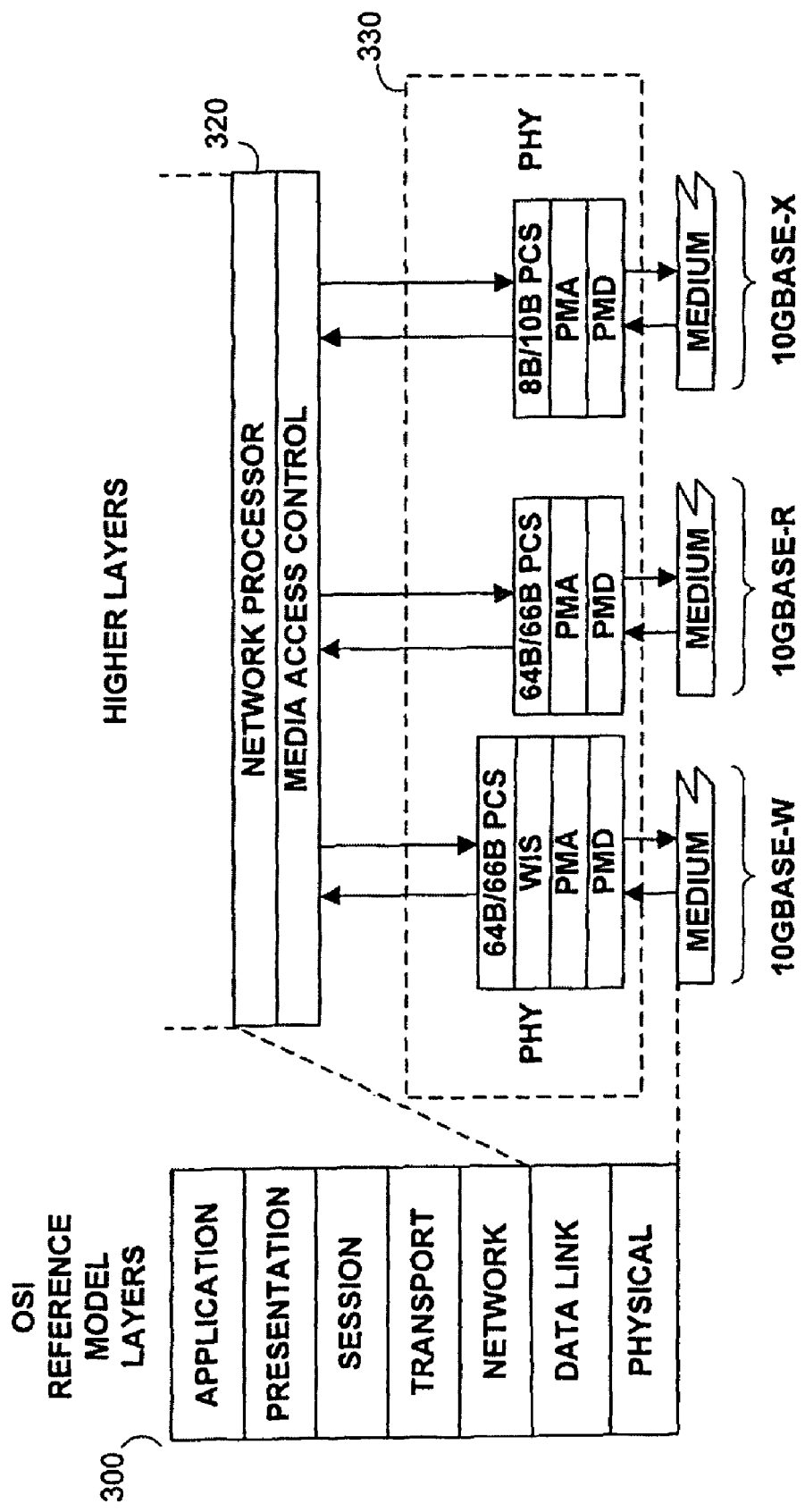
FIG. 3 is an illustrative diagram of the OSI Model as it relates to the programmable logic device of FIG. 1 in accordance with the invention.

FIG. 3 shows the Open Systems Interconnection Basic Reference Model 300 (OSI Model) and illustrates how it relates to the system of FIG. 1. OSI Model 300, shown in its entirety, is a layered, abstract description for communications and computer network protocol design. From top to bottom, the OSI Model consists of the Application, Presentation, Session, Transport, Network, Data Link, and Physical layers. A layer is a collection of related functions that provides services to the layer above it and receives service from the layer below it. For example, a layer that provides error-free communications across a network provides the path needed by applications above it, while it calls the next lower layer to send and receive packets that make up the contents of the path. FIG. 1 shows an implementation for a optimized physical (PHY) layer for 10 GbE that can integrate with higher layers implemented in the PLD.

Shown to the right of OSI model 300 FIG. 3 is a blow-up of the bottom two layers for each of the three 10 GbE PHY layer architectures defined in the 10 GbE IEEE 802.3ae specification: 10GBASE-W, 10GBASE-R, and 10GBASE-X. The system of FIG. 1 may be used to implement each of these three architectures. Data link layer 320 contains the network processor and media access control elements that are both implemented within PLD fabric 10 as shown in FIG. 1. These layers and all of the proceeding layers are the same for all three architectures. PHY layer 330, however, is different for each of the three architectures. All of the PHY layers contain a PCS layer, a physical medium attachment (PMA) layer, and a physical medium dependent layer. The PCS layer, which is implemented within PLD fabric 10, connects to the higher layers via the PLD fabric interconnects. The PMA layer is implemented by transceiver channel 50 and connects to the PCS layer via the 64-bit interface between PLD fabric 10 and transceiver channel 50. The PMD layer is implemented by 10 GbE optical transceiver module 110 and connects to the transceiver channel via a high speed serial interface. 10 GbE optical transceiver module 110 connects to the optical fiber medium.

For the 10GBASE-W and 10 GBASE-R architectures, 64-bit interface between PLD fabric 10 and transceiver channel 50 allows a direct connection to the 64B/66B PCS. For the 10GBASE-X architecture, which uses a 8B/10B PCS, a rate converter (sometimes referred to as a gear box) can be implemented within the PLD to convert the 64-bit interface into an 80-bit interface. However, because this interface is implemented within the PLD, this data-width conversion can be may using the programmable logic.

Figure 4:
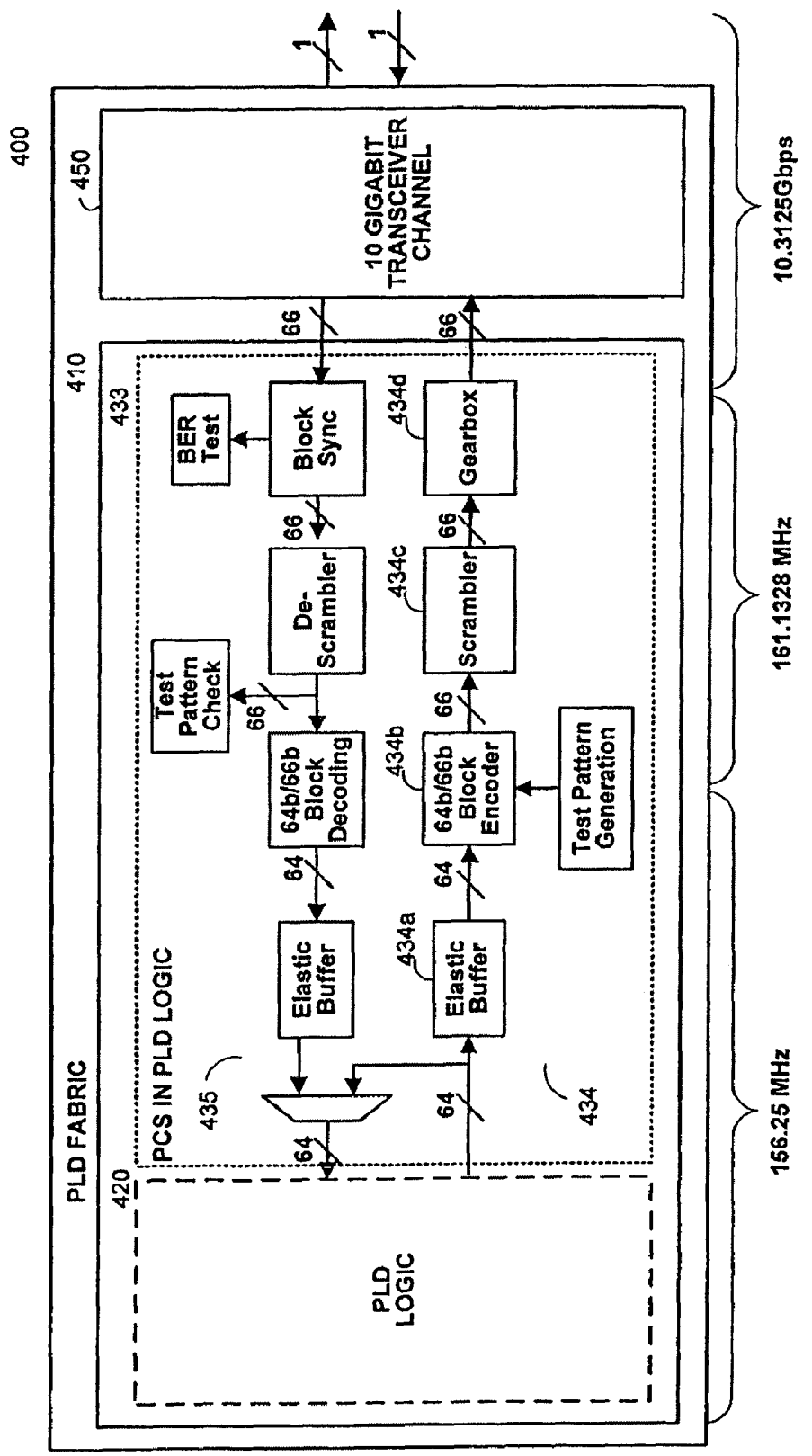
FIG. 4 is a simplified schematic block diagram of a physical coding sublayer design that can be implemented within a programmable logic device.

FIG. 4 shows a simplified block diagram of a PCS layer 433 for implementing a 10GBASE-R architecture within PLD fabric 410 of PLD 400. 10GBASE-W and 10GBASE-X architectures may be implemented in a similar manner. PLD fabric 410 also includes PLD logic portion 420 which may include a PLD logic design as well as higher-level 10 GbE networking functions. The partition between PLD logic portion 420 and PCS layer 433 may be artificial and is done primarily for the purposes of discussion herein. PCS layer 433 can be implemented within PLD fabric 410 and may function as an interface between the higher-level 10GgE networking functions also implemented within PLD fabric 410 and 10 GbE transceiver channel 450. PCS layer 433 includes a transmit path 434 and a receive path 435.

Transmit path 434 receives a 64-bit parallel signal from PLD logic 420. Elastic buffer 434*a* may buffer the 64-bit signal and provide it to 64/66 block encoder 434*b*. 64/66 block encoder 434*b* can receive the 64-bit parallel signal and output a 66-bit encoded signal. The encoding process, by adding additional bits to the data may increase the effective bit rate of the data signal. For example, as shown in FIG. 4, the 64-bit data signal may have a frequency of 156.25 MHz while the 66-bit data signal may have a frequency of 161.1328 MHz. It should be understood that these frequencies are merely illustrative and that any suitable frequencies may be used. The encoded 66-bit signal is provided to scrambler 434*c* for further encoding. Finally, gearbox 434*d* converts the 66-bit signal back into a 64-bit signals while maintaining the same data rate. This 64-bit parallel signal is provided to 10 GbE transceiver channel 450 which outputs a serial output at approximately 10 gigabits per second. Receive path 435 operates in a similar manner as transmit path 434, receiving a parallel data signal from 10 GbE transceiver channel 450, synchronizing, descrambling, decoding, buffering, and providing the signal to PLD logic 420. Additional circuitry such as test pattern check 436*a*, test pattern generation 436*b*, and BER test 436*c* may also be provided within PCS layer 433 for device testing.

By way of recapitulation and extension of the above, some of the benefits and advantages of the invention are summarized in the following one benefit/advantage of the invention is that it can support all three PHY layer architectures (10GBASE-W, 10GBASE-R, and 10GBASE-X) defined in the 10 GbE IEEE 802.3 specification. Only the programmable logic would need to be modified to switch between these architectures. System costs and complexity can also be reduced by scaling down the number of components required to implement the 10 GbE PHY layer. Latency may also be reduced by implementing key features of the 10 GbE PHY layer within the PLD. Furthermore, because the full 10 GbE PHY layer can be implemented using only a PLD and an optical transceiver such as a 10 Gigabit Small Form Factor Pluggable (XFP) module multiple ports can be implemented within a single PLD. Additionally the cost, power consumption, and size associated with the optical transceiver can be significantly less than an optical module that includes 10 GbE PHY circuitry.

Another possible benefit/advantage of the invention is the 64-bit interface within the PLD between the PLD fabric and the 10 GbE transceiver. By implementing the 10 GbE transceiver within the PLD, instead of outside the PLD, there is no need to implement a 64-bit output from the PLD which would require additional buffers, clock dividers, and clocks. Further, this interface reduces that latency, complexity, timing constraints, and power consumption of the path design. Finally, the 64-bit interface can directly connect to 10GBASE-W and 10 GBASE-R PCS layers. This allows designers using the PLD to use standard PCS layer implementations within the PLD.

Still another possible benefit/advantage of the invention is that the 10 GbE PHY layer portions implemented within the PLD are programmable and customizable. Proprietary link features may be implemented within the PLD. Designs can also be updated and re-designed without hardware modification can decrease transceiver power consumption.

It will be understood that the foregoing is only illustrative of the principles of the invention, and that various modifications can be made by those skilled in the art without departing from the scope and spirit of the invention. For example, the clock speeds and bus widths mentioned specifically above are only examples, and parameters such as these can have other values in other embodiments of the invention. And again, although the invention has been illustratively described for the most part herein in the context of PLDs, the invention is equally applicable to any type of integrated circuit, especially integrated circuits that are programmable.

The invention claimed is:

1. An integrated circuit for processing 10 Gigabit Ethernet (10 GbE) signals comprising:
    programmable logic device (PLD) circuitry, wherein the PLD circuitry comprises PLD fabric that includes an array of blocks of programmable logic and programmable interconnection resources;
    10 GbE physical coding layer (PCS) circuitry programmed into the programmable logic device fabric;
    10 GbE transceiver circuitry implemented in dedicated circuitry that receives a 64-bit parallel data signal from the programmable logic device circuitry and generates a serial 10 GbE data signal from the parallel data signal, wherein the dedicated circuitry is distinct from the programmable logic device (PLD) circuitry; and
    interface circuitry that interconnects a portion of the programmable logic device circuitry with the transceiver.

2. The integrated circuit of claim 1, wherein the transceiver circuitry comprises clock management unit (CMU) circuitry that receives a reference clock signal and that generates a high-speed serial clock signal.

3. The integrated circuit of claim 2, wherein the reference clock signal is received from the programmable logic device circuitry.

4. The integrated circuit of claim 2, wherein the reference clock signal is received from a source external to the integrated circuit.

5. The integrated circuit of claim 2, wherein the CMU circuitry comprises frequency multiplying phase-locked loop circuitry.

6. The integrated circuit of claim 5, wherein the CMU circuitry comprises two frequency multiplying phase-locked loop circuits.

7. The integrated circuit of claim 6, where a first multiplying phase-locked loop circuit comprises an inductive voltage controlled oscillator and a second multiplying phase-locked loop circuit comprises a ring voltage-controlled oscillator.

8. The integrated circuit of claim 1, wherein the transceiver circuitry receives a serial 10 GbE data signal and generates a 64-bit parallel data signal from the serial data signal and provides the serial data signal to the programmable logic device circuitry.

9. The integrated circuit of claim 1, wherein the transceiver circuitry is coupled to an external optical transceiver module.

10. The integrated circuit of claim 1, wherein the transceiver circuitry and the interface circuitry are implemented using hard-wired components.

11. The integrated circuit of claim 1, wherein the integrated circuit implements a 10 GbE physical (PHY) layer.

12. The integrated circuit of claim 11, wherein the 10 GbE physical coding layer (PCS) circuitry implemented in the programmable logic device circuitry is programmable to implement the 10 GbE PHY layers of 10 GBASE-W, 10 GBASE-R, and 10 GBASE-X architectures.

13. The integrated circuit of claim 1, wherein the programmable interconnection resources connect the array of blocks of programmable logic with blocks other than the array of blocks of programmable logic.

14. The integrated circuit of claim 1, wherein the dedicated circuitry is pre-configured and hard-wired to perform a dedicated function.

15. An integrated circuit for processing 10 Gigabit Ethernet (10 GbE) signals comprising:
    programmable logic device (PLD) fabric that includes an array of blocks of programmable logic and programmable interconnection resources, wherein the programmable logic device fabric is programmed to implement:
        user-specified logic circuitry,
        network processor circuitry,
        media access control circuitry, and
        physical coding sublayer circuitry; and
    10 GbE transceiver circuitry implemented in dedicated circuitry that receives a 64-bit parallel data signal from the programmable logic device fabric and generates a serial 10 Gigabit Ethernet data signal from the parallel data signal, wherein the dedicated circuitry is distinct from the programmable logic device (PLD) circuitry.

16. The integrated circuit of claim 15, wherein the transceiver circuitry comprises clock management unit (CMU) circuitry that receives a reference clock signal and that generates a high-speed serial clock signal.

17. The integrated circuit of claim 16, wherein the reference clock signal is received from the programmable logic device fabric.

18. The integrated circuit of claim 16, wherein the reference clock signal is received from a source external to the integrated circuit.

19. The integrated circuit of claim 16, wherein the CMU circuitry comprises frequency multiplying phase-locked loop circuitry.

20. The integrated circuit of claim 19, wherein the CMU circuitry comprises two frequency multiplying phase-locked loop circuits.

21. The integrated circuit of claim 20, where a first multiplying phase-locked loop circuit comprises an inductive voltage controlled oscillator and a second multiplying phase-locked loop circuit comprises a ring voltage-controlled oscillator.

22. The integrated circuit of claim 15, wherein the transceiver circuitry receives a serial 10 GbE data signal and generates a 64-bit parallel data signal from the serial data signal and provides the serial data signal to the programmable logic device fabric.

23. The integrated circuit of claim 15, wherein the transceiver circuitry is coupled to an external optical transceiver module.

24. The integrated circuit of claim 15, wherein the transceiver circuitry is implemented using hard-wired components.

25. The integrated circuit of claim 15, wherein the integrated circuit implements a 10 GbE physical (PHY) layer.

26. The integrated circuit of claim 25, wherein the 10 GbE physical coding layer (PCS) circuitry implemented in the programmable logic device fabric is programmable to implement the 10 GbE PHY layers of 10 GBASE-W, 10 GBASE-R, and 10 GBASE-X architectures.

* * * * *